US008022932B2

(12) United States Patent
Vander Veen

(10) Patent No.: US 8,022,932 B2
(45) Date of Patent: *Sep. 20, 2011

(54) HANDHELD ELECTRONIC DEVICE WITH REDUCED KEYBOARD AND ASSOCIATED METHOD OF PROVIDING IMPROVED DISAMBIGUATION WITH REDUCED DEGRADATION OF DEVICE PERFORMANCE

(75) Inventor: Raymond Vander Veen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,889

(22) Filed: Aug. 9, 2010

(65) Prior Publication Data

US 2010/0328220 A1    Dec. 30, 2010

Related U.S. Application Data

(63) Continuation of application No. 11/116,895, filed on Apr. 28, 2005, now Pat. No. 7,796,121.

(51) Int. Cl.
*G09G 5/00* (2006.01)
(52) U.S. Cl. ............................ 345/168; 345/156; 341/22
(58) Field of Classification Search .................. 345/156, 345/168–172; 341/22–26; 704/710
See application file for complete search history.

(56) References Cited

U.S. PATENT DOCUMENTS

| 5,845,306 A | 12/1998 | Schabes et al. |
| 5,953,541 A | 9/1999 | King et al. |
| 6,286,064 B1 | 9/2001 | King et al. |
| 7,796,121 B2 * | 9/2010 | Vander Veen ................. 345/168 |
| 2002/0126097 A1 | 9/2002 | Savolainen |
| 2004/0104896 A1 | 6/2004 | Suraqui |
| 2004/0201607 A1 | 10/2004 | Mulvey et al. |

FOREIGN PATENT DOCUMENTS

WO   WO 2004059958    7/2004

OTHER PUBLICATIONS

PCT Notification of Transmittal of the International Search Report and the Written Opinion in corresponding International Appln. No. PCT/CA2006/000664, mailed Aug. 3, 2006, 12 pages.
PCT Notification of Transmittal of International Preliminary Report on Patentability in corresponding International Appln. No. PCS/CA2006/000664, mailed Sep. 6, 2007, 16 pages.

(Continued)

*Primary Examiner* — Kevin Nguyen
*Assistant Examiner* — Cory Almeida
(74) *Attorney, Agent, or Firm* — Finnegan, Henderson, Farabow, Garrett & Dunner LLP

(57) ABSTRACT

In view of the foregoing, an improved handheld electronic device having a reduced keyboard provides facilitated language entry by making available to a user certain words that a user may reasonably be expected to enter. Incoming data, such as the text of a message, can be scanned for proper nouns, for instance, since such proper nouns might not already be stored in memory and might be expected to be entered by the user when, for example, forwarding or responding to the message. A proper noun can be identified, for instance, on the basis that it begins with an upper case letter. The proper nouns can be stored, for example, in memory that may, by way of further example, be a temporary dictionary.

20 Claims, 3 Drawing Sheets

OTHER PUBLICATIONS

Canadian Office Action in corresponding Canadian Appln. No. 2,605,785, dated Sep. 24, 2009, 2 pages.
European Search Report mailed by European Patent Office in corresponding European Appln. No. 05 252 667.0, dated Jul. 28, 2005, 8 pages.
Communication mailed by European Patent Office in corresponding European Appln. No. 05 252 667.0, dated Dec. 20, 2005, 5 pages.
Communication mailed by European Patent Office in corresponding European Appln. No. 05 252 667.0, dated Sep. 21, 2006, 5 pages.
Summons to Attend Oral Proceedings mailed by European Patent Office in corresponding European Appln. No. 05 252 667.0, dated Nov. 28, 2007, 8 pages.
The Minutes of the Oral Proceedings mailed by European Patent Office in corresponding European Appln. No. 05 252 667.0, dated Oct. 15, 2008, 5 pages.
Decision to Refuse mailed by European Patent Office in corresponding European Patent Appln. No. 05 252 667.0, dated Oct. 22, 2008, 11 pages.

* cited by examiner

HANDHELD ELECTRONIC DEVICE WITH REDUCED KEYBOARD AND ASSOCIATED METHOD OF PROVIDING IMPROVED DISAMBIGUATION WITH REDUCED DEGRADATION OF DEVICE PERFORMANCE

RELATED APPLICATIONS

This application is a continuation of U.S. application Ser. No. 11/116,895, filed Apr. 28, 2005 now U.S. Pat.No. 7,796,121, the contents of which are incorporated herein by reference.

BACKGROUND

1. Field

The invention relates generally to handheld electronic devices and, more particularly, to a handheld electronic device that has a reduced keyboard and that facilitates the entry of text in communications.

2. Description of the Related Art

Numerous types of handheld electronic devices are known. Examples of such handheld electronic devices include, for instance, personal data assistants (PDAs), handheld computers, two-way pagers, cellular telephones and the like. Many handheld electronic devices also feature a wireless or other communication capability, although other handheld electronic devices are stand-alone devices that are functional without communication with other devices. Such handheld electronic devices are generally intended to be portable, and thus are of a relatively compact configuration in which keys and other structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable.

In language entry applications, such as in a messaging or e-mail application, a keypad must be capable of generating substantially all of the elements desirable or necessary to form the relevant language. For example, in a language that employs Latin letters, a keypad must be capable of generating substantially all twenty-six of the Latin letters. In order to provide such functionality with relatively few keys, some keypads have included multiple linguistic elements per key, such as providing a plurality of Latin letters on each of at least some of the keys when the keypad is used to generate a language that employs Latin letters.

In order to make use of the multiple linguistic elements on any given key, numerous keystroke interpretation systems have been provided. For instance, a "multi-tap system" allows a user to substantially unambiguously specify a particular linguistic element, for example, on a key by pressing the same key a number of times equal to the position of the desired linguistic element on the key. Anther keystroke interpretation system includes key chording in which keys are pressed in various combinations to achieve particular results. Still another keystroke interpretation system might include a disambiguation routine which seeks to interpret the keystrokes in view of stored dictionary data, linguistic rules, stored algorithms, and/or the like.

While such disambiguation systems have been generally effective for their intended purposes, such disambiguation systems are not without limitation. In certain applications, the function of a disambiguation routine can be cumbersome if a user must expend substantial effort in entering language. One such situation in which this may occur is in the context of a word that may not already be in the stored dictionary. Another exemplary situation in which this may occur is when a word is already be stored in the dictionary but is considered to have a relatively low frequency, and this may require significant input effort by the user to achieve the desired word. Also, a desired word may not already be stored in the dictionary of the device. It thus would be desirable to provide a handheld electronic device having a reduced keyboard wherein the device might make available to a user words and the like that the user might reasonably be expected to enter, with such availability being provided substantially without introducing a significant processing burden on the device. Such words and the like might, for example, be somewhat unconventional.

BRIEF DESCRIPTION OF THE DRAWINGS

Similar numerals refer to similar parts throughout the specification.

DESCRIPTION

Figure 1:
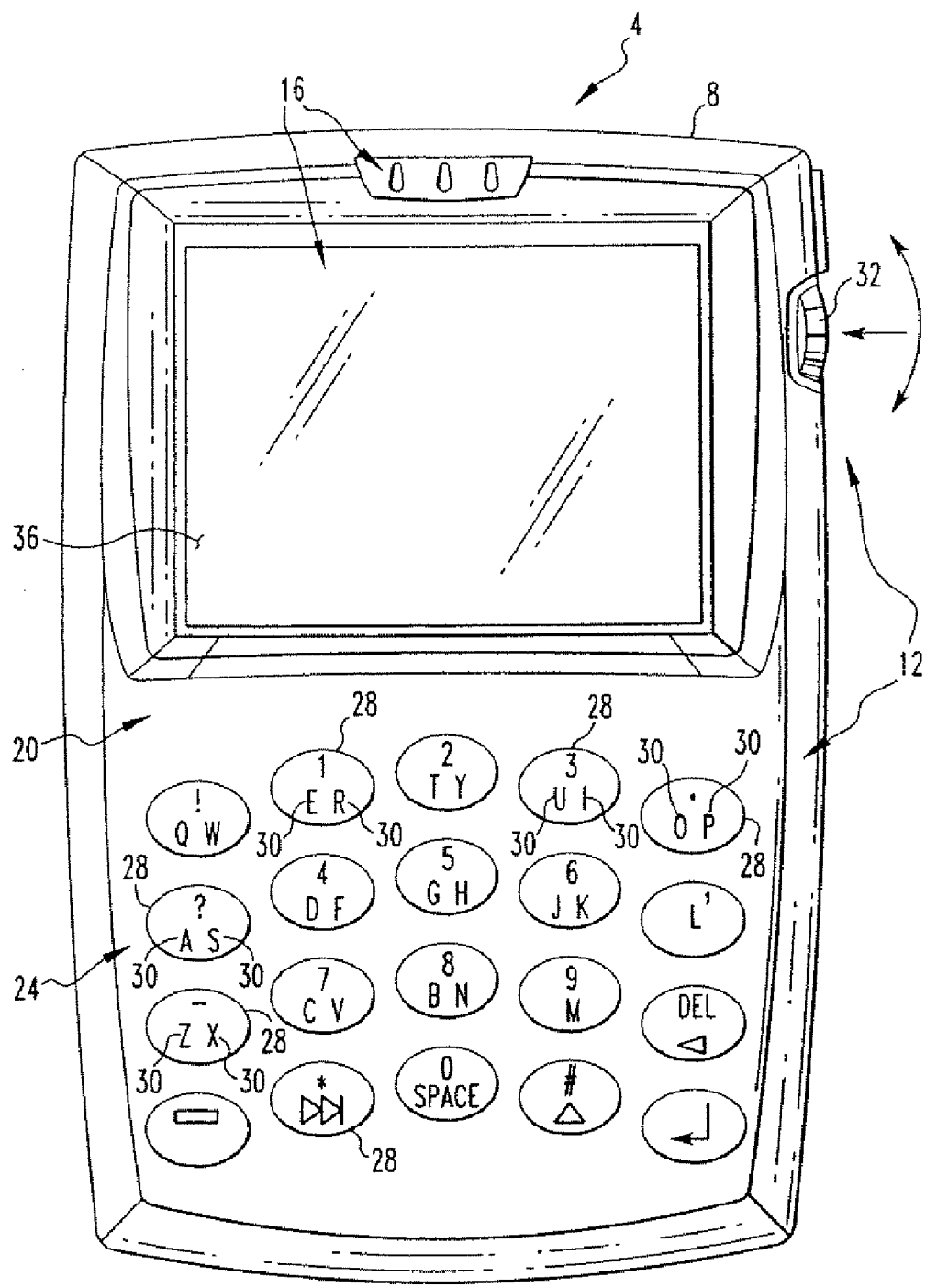
FIG. 1 is a front elevational view of an improved handheld electronic device.

An improved handheld electronic device having a reduced keyboard provides facilitated language entry by making available to a user certain words that a user may reasonably be expected to enter. Incoming data, such as the text of a message, can be scanned for proper nouns, for instance, since such proper nouns might not already be stored in memory and might be expected to be entered by the user when, for example, forwarding or responding to the message. A proper noun can be identified, for instance, on the basis that it begins with an upper case letter. The proper nouns can be stored, for example, in memory that may, by way of further example, be a temporary dictionary.

Accordingly, an aspect of the invention is to provide an improved handheld electronic device that has a reduced keyboard and that provides facilitated entry of language.

Another aspect of the invention is to provide an improved handheld electronic device having a reduced keyboard that can store certain data in one or more temporary or other dictionaries for retrieval in certain contexts.

Another aspect of the invention is to provide an improved handheld electronic device that has a reduced keyboard, that identifies proper nouns in incoming data, and that stores the proper nouns in memory for later identification.

Another aspect of the invention is to provide an improved handheld electronic device that has a reduced keyboard and that facilitates the entry of language without introducing a significant degradation in performance to provide such feature.

Another aspect of the invention is to provide an improved method of enabling disambiguation of an entry on a handheld electronic device having a reduced keyboard.

These and other aspects of the invention are provided by an improved method of enabling disambiguation of an input into a handheld electronic device. The handheld electronic device is of a type that includes an input apparatus, an output apparatus, and a memory having a plurality of objects stored therein. The plurality of objects include a plurality of language objects. The input apparatus includes a plurality of input members, with each of at least a portion of the input members having a plurality of linguistic elements assigned thereto. The general nature of the method can be stated as including receiving on the handheld electronic device a quantity of data including a number of language objects, identifying from among the number of language objects a number of proper language objects, and storing in the memory at least some of the proper language objects. The method further includes detecting an ambiguous input including a number of input member actuations, with each of at least a portion of the input members including a number of linguistic elements assigned thereto, and with at least one of the input members having a plurality of linguistic elements assigned thereto. The method further includes identifying in the memory a proper language object that corresponds with the ambiguous input and outputting at least a portion of the proper language object as a proposed disambiguation of the ambiguous input.

Other aspects of the invention are provided by an improved handheld electronic device, the general nature of which can be stated as including a processor apparatus, an input apparatus, and an output apparatus. The processor apparatus includes a memory having a plurality of objects stored therein, with the plurality of objects including a plurality of language objects. The input apparatus includes a plurality of input members, with each of at least a portion of the input members having a plurality of linguistic elements assigned thereto. The handheld electronic device is adapted to receive thereon a quantity of data including a number of language objects. The processor apparatus is adapted to identify from among the number of language objects a number of proper language objects. The processor apparatus is adapted to store in the memory at least some of the proper language objects. The processor apparatus is adapted to detect an ambiguous input including a number of input member actuations, with each of at least a portion of the input members including a number of linguistic elements assigned thereto, and with at least one of the input members having a plurality of linguistic elements assigned thereto. The processor apparatus is adapted to identify in the memory a proper language object that corresponds with the ambiguous input. The output apparatus is adapted to output at least a portion of the proper language object as a proposed disambiguation of the ambiguous input.

Figure 2:
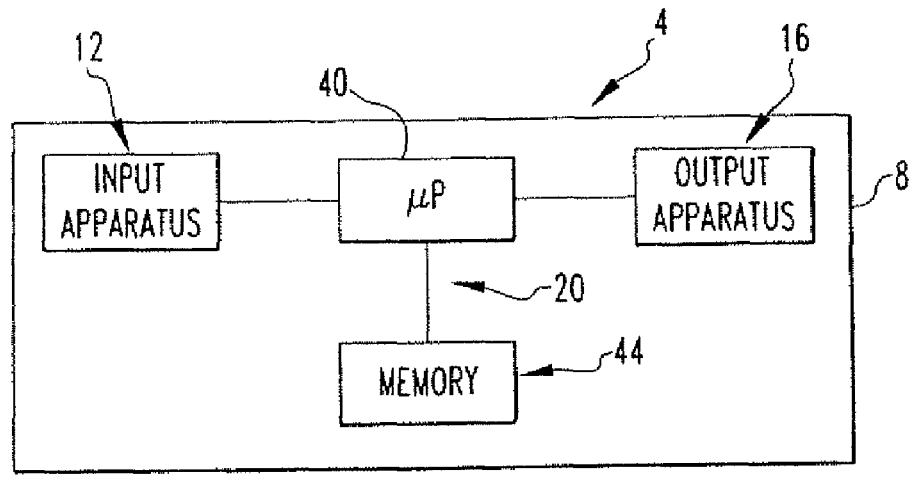
FIG. 2 is a schematic view of the handheld electronic device of FIG. 1.
Figure 3:
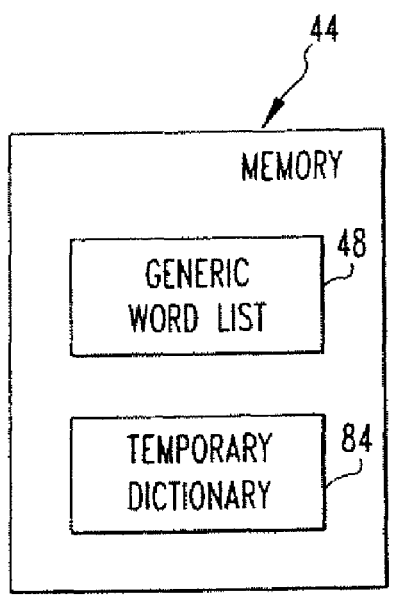
FIG. 3 is a schematic view of a portion of a processor apparatus of the handheld electronic device of FIG. 2.

An exemplary improved handheld electronic device 4 in accordance with the invention is indicated generally in FIGS. 1 and 2. The handheld electronic device 4 includes a case 8, an input apparatus 12, an output apparatus 16, and a processor apparatus 20. The present exemplary embodiment of the handheld electronic device 4 includes applications and/or routines resident thereon such as, for example, and without limitation, a disambiguation routine and an e-mail client, although other and/or additional applications and/or routines can be provided.

The input apparatus includes a keypad 24 that includes a plurality of keys 28. The input apparatus 12 additionally includes a track wheel 32 for additional input. Many of the keys 28 have one or more letters 30 assigned thereto, and a some of the keys 28 have a plurality of letters 30 assigned thereto. In the present exemplary embodiment, the exemplary letters 30 are Latin letters, and the exemplary Latin letters serve as linguistic elements for language entry into the handheld electronic device 4. It is understood that while the linguistic elements of the instant exemplary embodiment are depicted as being characters, specifically Latin letters, the linguistic elements could be other elements such as, for example and without limitation, other types of characters, ideograms, portions of ideograms such as strokes, and other elements that can be used in the generation of language. The expressions "text" and "word", and variations thereof, are to be broadly construed herein and are not intended to be limiting in any fashion with regard to a particular language, a particular portion of a language or a means of providing an expression in a language, or to a particular language type or format.

The output apparatus 16 in the present exemplary embodiment includes a display 36. The output apparatus 16 may additionally include other output devices such as lights, speakers, and other output devices without limitation.

As can be seen in FIG. 2, the processor apparatus 20 includes a processor which may be, for instance and without limitation, a microprocessor (µP) 40 and which is responsive to inputs from the input apparatus 12 and provides output signals to the output apparatus 16. The processor apparatus 20 additionally includes a memory 44 with which the microprocessor 40 interfaces. The memory 44 can be any of a variety of storage devices such as, for example and without limitation, RAM, ROM, EPROM, EEPROM, and/or other devices.

The memory 44 includes a generic word list 48 that has a plurality of language objects and frequency objects stored therein. The language objects are, in the instant example, representative of words. The language objects and the frequency objects are associated. A given frequency object is representative of a frequency value that reflects, for instance, the relative likelihood that a language object with which the frequency object is associated is what is intended by a user when the user makes an input via the keypad 24. The memory 44 includes other objects stored and organized therein, as will be described in greater detail below.

The processor apparatus 20 has resident thereon a disambiguation routine that interfaces with the memory 44 and the objects stored therein to provide output in response to input via the input apparatus 12. Certain words and the like may advantageously be stored in one or more temporary dictionaries or other dictionaries in the memory 44 and made available to the user, such as when the user might reasonably be expected to wish to input such words. The words in such a temporary or other dictionary may be accorded a relatively high frequency value in order that such words, if appropriate, will be presented in whole or in part to the user at an early opportunity during the text entry process to limit the editing effort and other input that might otherwise be required to enter such words.

Figure 4:
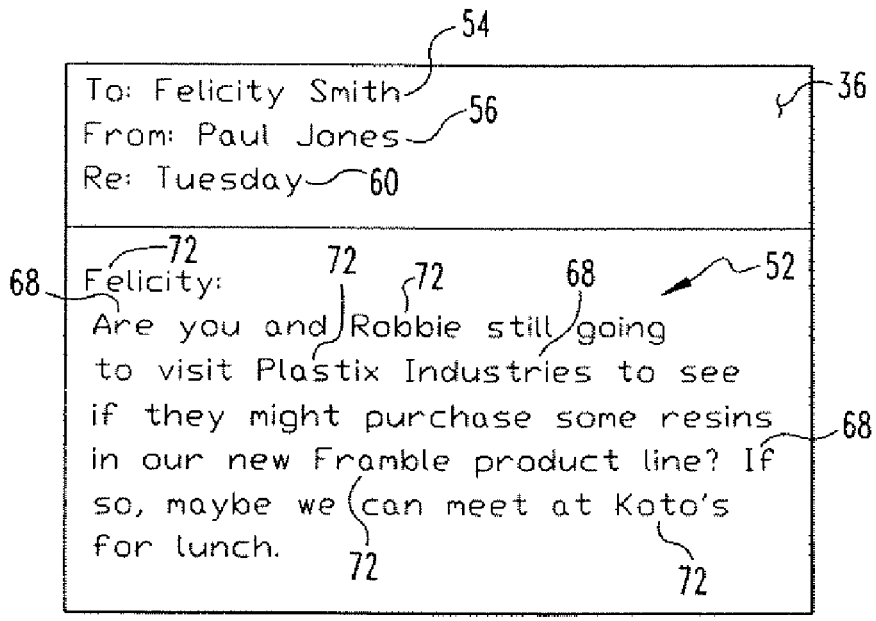
FIG. 4 is a first exemplary message on the handheld electronic device of FIG. 1.

Although many uses for the invention will be apparent, one exemplary use is presented herein as being in the context of electronic mail. As can be seen in FIG. 4, for example, a messages 52 has been received on the handheld electronic device 4. The exemplary message 52 in FIG. 4 includes, for instance, a recipient 54, a sender 56, and a subject 60 for reference by the user.

Each such message 52 can be said to include a quantity of data which, in the example of such a message 52, is comprised largely of text. Such text may include a number of language objects in the form of words, shortcuts, and the like that may include known parts of speech such as nouns, verbs, pronouns, adverbs, etc.

In a situation where, for example, a user enters a replying or forwarding command with respect to one of the messages 52, the user can reasonably be expected to wish to enter certain language. Such expected language might include, for example, a reference to something that has already been referred to in a prior message, for instance a prior message in the same message thread. In some circumstances, some of the language that a user can reasonably be expected to wish to enter can be ascertained prior to entry of such language by the user.

Thus, certain language is advantageously stored in one or more temporary or other dictionaries in the memory 44 for ready use by a user in entering language. While language is described herein as being stored in temporary dictionaries, it is understood that the language could alternatively be stored in relatively permanent dictionaries. It is also noted that the stored data is described herein as being employed in the context of a response to a message or a forwarding of a message, but it is understood that the stored data can be used in any type of data entry context, such as in the context of using a browser, a word processor, and the like without limitation.

In identifying language objects that the user might be expected to enter and that may not already be stored in the memory 44, the device 4 and the exemplary method in accordance with the invention advantageously identify proper language objects such as proper nouns, for instance, in the message 52 for potential storage in a dictionary. An exemplary proper noun might include, for example, the name of a person, the name of a place, the name of a product, the name of a business, etc., without limitation. In the present exemplary embodiment that employs the English language, a proper noun typically begins with an upper case letter. In order to identify proper nouns, therefore, the device 4 analyzes data, such as the incoming message 52, and identifies the words in the data that begin with an upper case letter. The identified words can then be compared with words in the generic word list 48. An upper case word that is not found in the generic word list 48 can then be added to a temporary dictionary 84 on the basis that the upper case word is likely to be a proper noun. If an identified word is found in the generic word list 48, the identified word might be ignored and not added to the temporary dictionary 84 on the basis that it is already stored elsewhere in the memory 44. As an alternative, an identified word that is found in the generic word list 48 may be stored in the temporary dictionary 84 in a form having its first letter being an upper case letter if, for example, the corresponding word stored in the generic word list 48 is a lower case word.

While the exemplary device 4 and method are described herein in the context of proper language objects beginning with an upper case letter, it is understood that proper language objects in non-English languages potentially can be identified in other fashions. It thus is understood that the teachings herein are not intended to be limited to proper language objects having initial upper case letters. Rather, the teachings can be applied to any type of proper language object that can be generally identified by the device 4 as being such.

The analysis of all of the language objects in a quantity of data such as a message can be cumbersome and can consume a significant portion of the processing capability of the device 4, particularly if the message is long. Proper nouns are a class of language object that the user can reasonably be expected to type and that have a good likelihood of not already having been stored in a dictionary on the device 4. Limiting such additional processing substantially to words having an initial upper case letter, which would include proper nouns, thus advantageously saves processing power and provides enhanced disambiguation capability without introducing significant processing overhead to provide such benefit.

Figure 5:
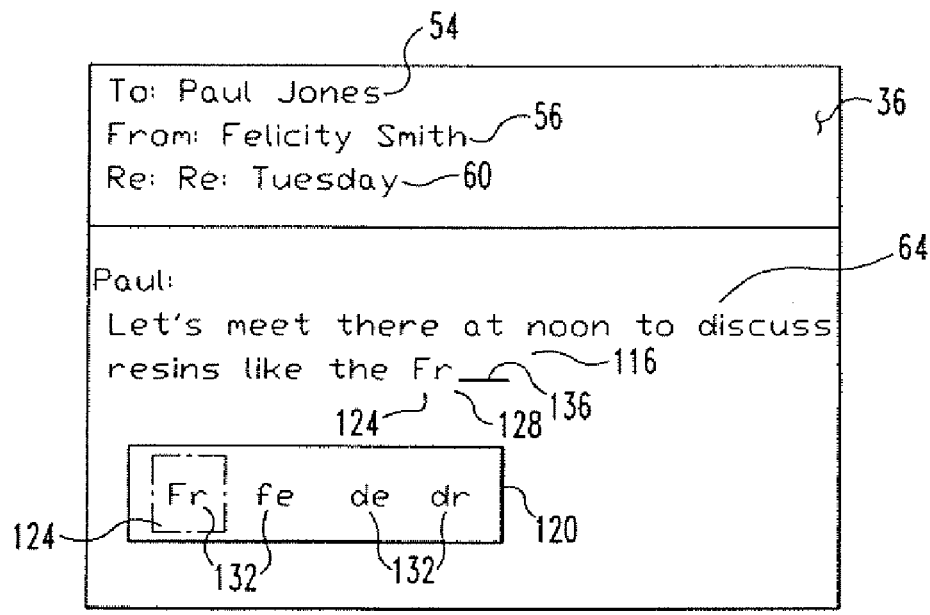
FIG. 5 is another exemplary message on the handheld electronic device.

An example is presented in FIGS. 4-5. The message 52 includes the following words with initial upper case letters: "Felicity", "Are", "Robbie", "Plastix", "Industries", "Framble", "If", and "Koto's". Words such as "Are", "Industries", and "If" are ordinary nouns 68 that likely to be found in the generic word dictionary 48. Such ordinary nouns 68 are unlikely to become stored in the temporary dictionary 84, unless such words are being stored as new words with an initial capital, as mentioned above. Words such as "Felicity", "Robbie", "Plastix", "Framble", and "Koto's" are proper nouns 72 and are unlikely to be found in the generic word dictionary 48. The words "Felicity", "Robbie", "Plastix", "Framble", and "Koto's", if not found in the generic word list 48, will be stored in the temporary dictionary 84 for use in facilitating future text entry.

In this regard, of the eight words "Felicity", "Are", "Robbie", "Plastix", "Industries", "Framble", "If", and "Koto's" that were analyzed by the processor apparatus 20, three of the words, i.e., "Are", "Industries", and "If", were ordinary nouns 68. Five of the eight words, i.e., "Felicity", "Robbie", "Plastix", "Framble", and "Koto's", were proper nouns 72. It is further noted that the message 52 includes a total of thirty-five words. Only five words of the thirty-five were proper nouns 72, and in the present example these five words are the only words that had not previously been stored on the device 4. The processing of only eight words, i.e., the words starting with an upper case letter, to obtain the five proper nouns 72 advantageously requires significantly less processing by the device 4 than if the device 4 were required to process all thirty-five words of the message 52 in order to identify the five words, i.e., "Felicity", "Robbie", "Plastix", "Framble", and "Koto's", that had not previously stored in the memory 44.

The device 4 can be configured in any of a variety of fashions to enable it to identify proper words for potential storage in the memory 44. The example mentioned above is directed generally toward the device 4 identifying proper words by identifying words having an initial upper case character. This can be accomplished in various ways. For example, the device 4 could be configured to identify words having an initial character within the ASCII range A through Z. This ASCII range includes the upper case Latin letters. The device additionally or alternatively could be configured, for example, to identify words having an initial character coded to be within a certain range in the Unicode standard or being among a predetermined Unicode set. Other ways of identifying proper words will be apparent. While the example presented herein is directed toward the identification of proper words by identifying words having an initial character that is upper case, the device could additionally or alternatively be configured to identify, for instance, upper case letters that are other than the initial character, characters that include a diacritic, and the like without limitation.

The first temporary dictionary 84 may additionally include frequency objects stored therein that provide frequency values for association with the stored language objects. Alternatively, the language objects in the first temporary dictionary 84 may be associated in some other fashion with a frequency value that is relatively high. In this regard, and as will be set forth in greater detail below, the exemplary disambiguation routine employed on the handheld electronic device 4 identifies language objects in the memory 44 and presents the language objects, in whole or in part, to the user in response to an ambiguous input for the purpose of providing proposed disambiguated interpretations of the ambiguous input. The output oftentimes may include a plurality of language objects, in whole or in part, listed in some fashion in a descending order of frequency value and/or in accordance with other criteria. By associating with the language objects stored in the first temporary dictionary 84 frequency objects of a relatively high frequency value, the language objects identified in the first temporary dictionary 84 during operation of the disambiguation routine may be output at a position of relatively high probability, i.e., frequency, in order to make such language objects readily available to the user. Such ready access to such language objects by the user facilitates entry and reduces the amount of input effort that may otherwise be required of the user.

An exemplary new message 64 in the form of a reply message to the original message 52 is depicted in FIG. 5. A text input location 128 is indicated by a cursor 136. The present exemplary new message 64 includes a text component 116 and a variant component 120. The text component 116 is output at a text input location 128. The variant component 120 is, in the exemplary embodiment of the depicted handheld electronic device 4, output at a lower region of the display 36. The contents of the output include a default output 124 and a number of variants 132. The default output 124 "Fr" is depicted as being output as both the text component 116 at the text input location 128 and as the leftmost variant 132 in the variant component 120. In addition to the variant component 120 including the default output 124, the variant component 120 outputs a number of variants 132 adjacent the default output 124 to provide alternate proposed outputs.

In the present example, the user has actuated the key 28 to which the letters 30 "D" and "F" are assigned, followed by an actuation of the key 28 to which the letters 30 "E" and "R" are assigned. These key combinations could indicate a desire by the user to enter words such as "feed", "deep", "drive" and the like. When words such as this are identified in the generic word list 48, a portion of the word can be output as a variant 132 based in order of descending frequency. However, in the present example the word "Framble" has previously been identified as being a proper name and has already been added to the temporary dictionary 84. "Framble" has also been associated with a frequency object having a relatively high frequency value. In the present example, "Framble" is associated with a frequency object having a higher frequency value than any of the words in the generic word list 48 that correspond with the aforementioned two keystrokes. As such, "Fr" is listed as the default output 160.

In this regard, the word "Framble" is made available to the user to facilitate text entry. The word "Framble" was made available to the user because it previously had been identified as a proper noun 72 and was added as such to the temporary dictionary 84. The word "Framble" advantageously was identified by the processor apparatus 20 in the context of analyzing eight words from the message 52, rather than in the context of analyzing all thirty-five words of the message 52. The device 4 and the method described herein thus facilitate text entry, and this feature is provided without introducing significant additional processing overhead to the device 4.

A portion of the disclosure of this patent document contains material which is subject to copyright protection. The copyright owner has no objection to the facsimile reproduction by anyone of the patent document or patent disclosure, as it appears in the U.S. Patent and Trademark Office patent file or records, but otherwise reserves all copyrights whatsoever.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of enabling disambiguation of an input into a handheld electronic device, the handheld electronic device including an input apparatus, an output apparatus, and a memory having a plurality of objects stored therein, the plurality of objects including a plurality of language objects, the input apparatus including a plurality of input members, each of at least a portion of the input members of the plurality of input members having a plurality of linguistic elements assigned thereto, the method comprising:

receiving on the handheld electronic device data including one or more language objects;

identifying, from among the one or more language objects, one or more proper language objects that have an upper case character as a first character;

determining that one or more of the identified proper language objects includes the same characters as one of the plurality of language objects stored in the memory, wherein the plurality of language objects stored in the memory include a non-upper case character as the first character;

storing the identified one or more proper language objects in the memory;

detecting an ambiguous input including a number of input member actuations of a number of the input members, wherein at least one of the input members has a plurality of linguistic elements assigned thereto;

identifying one or more of the stored proper language objects that corresponds with the ambiguous input; and outputting at least a portion of the one or more stored proper language objects as a proposed disambiguation of the ambiguous input.

2. The method of claim 1, further comprising:
identifying as a proper language object a language object that is a proper noun.

3. The method of claim 1, further comprising:
identifying as a proper language object a language object having an initial portion that corresponds with a code designation within a predetermined range of code designations.

4. The method of claim 1, further comprising:
identifying as a proper language object a language object having an initial character within a predetermined ASCII range.

5. The method of claim 1, further comprising:
identifying as a proper language object a language object having an initial character within the ASCII range A through Z.

6. The method of claim 1, further comprising:
comparing the one or more proper language objects with the stored plurality of language objects to identify the one or more proper language objects for storage in the memory.

7. The method of claim 1, further comprising:
detecting at least one of a replying input and a forwarding input with respect to the data; and
responsive to said detecting, performing the identifying of the one or more proper language objects and the storing of the identified one or more proper language objects.

8. The method of claim 1, further comprising:
associating a frequency object with at least one of the one or more stored proper language objects.

9. The method of claim 1, wherein the outputting further comprises:
outputting the at least a portion of the one or more stored proper language objects as a default output; and outputting one or more stored language objects as a variant output.

10. The method of claim 9, further comprising:
associating a frequency object with at least one of the one or more stored proper language objects and the one or more stored language objects; and
outputting the at least a portion of the one or more stored proper language objects and the one or more stored language objects in descending order of frequency.

11. A handheld electronic device comprising an input apparatus, a processor apparatus, and an output apparatus, the input apparatus comprising a number of input members, at least some of the input members having a number of linguistic elements assigned thereto, at least some of the input members each having as the number of the linguistic elements assigned thereto a plurality of the linguistic elements, the processor apparatus comprising a processor and a memory having stored therein a plurality of objects comprising a plurality of language objects, at least some of the language objects each comprising a number of the linguistic elements, the output apparatus comprising a display, the memory having stored therein a number of routines which, when executed by the processor, cause the handheld electronic device to be adapted to perform operations comprising:
receiving on the handheld electronic device data including one or more language objects;
identifying, from among the one or more language objects, one or more proper language objects that have an upper case character as a first character;
determining that one or more of the identified proper language objects includes the same characters as one of the plurality of language objects stored in the memory, wherein the plurality of language objects stored in the memory include a non-upper case character as the first character;
storing the identified one or more proper language objects in the memory;
detecting an ambiguous input including a number of input member actuations of a number of the input members, wherein at least one of the input members has a plurality of linguistic elements assigned thereto;
identifying one or more of the stored proper language objects that corresponds with the ambiguous input; and
outputting to the display at least a portion of the one or more stored proper language objects as a proposed disambiguation of the ambiguous input.

12. The handheld electronic device of claim 11 wherein the operations further comprise:
identifying as a proper language object a language object that is a proper noun.

13. The handheld electronic device of claim 11 wherein the operations further comprise:
identifying as a proper language object a language object having an initial portion that corresponds with a code designation within a predetermined range of code designations.

14. The handheld electronic device of claim 11 wherein the operations further comprise:
identifying as a proper language object a language object having an initial character within a predetermined ASCII range.

15. The handheld electronic device of claim 11 wherein the operations further comprise:
identifying as a proper language object a language object having an initial character within the ASCII range A through Z.

16. The handheld electronic device of claim 11 wherein the operations further comprise:
comparing the one or more proper language objects with the stored plurality of language objects to identify the one or more proper language objects for storage in the memory.

17. The handheld electronic device of claim 11 wherein the operations further comprise:
detecting at least one of a replying input and a forwarding input with respect to the data; and
responsive to said detecting, performing the identifying of the one or more proper language objects and the storing of the identified one or more proper language objects.

18. The handheld electronic device of claim 11 wherein the operations further comprise:
associating a frequency object with at least one of the one or more stored proper language objects.

19. The handheld electronic device of claim 11 wherein the operations further comprise:
outputting the at least a portion of the one or more stored proper language objects as a default output; and
outputting one or more stored language objects as a variant output.

20. The handheld electronic device of claim 19 wherein the operations further comprise:
associating a frequency object with at least one of the one or more stored proper language objects and the one or more stored language objects; and
outputting the at least a portion of the one or more stored proper language objects and the one or more stored language objects in descending order of frequency.

* * * * *

UNITED STATES PATENT AND TRADEMARK OFFICE
CERTIFICATE OF CORRECTION

| | | |
|---|---|---|
| PATENT NO. | : 8,022,932 B2 | Page 1 of 2 |
| APPLICATION NO. | : 12/852889 | |
| DATED | : September 20, 2011 | |
| INVENTOR(S) | : Raymond Vander Veen | |

It is certified that error appears in the above-identified patent and that said Letters Patent is hereby corrected as shown below:

IN THE SPECIFICATIONS:

In column 1, line 11, "2005 now" should read --2005, now--.

In column 1, lines 11-12, delete the line break between "7,796," and "121," (should read --7,796,121,--).

In column 1, line 58, "Anther" should read --Another--.

In column 2, line 6, "already be stored" should read --already stored--.

In column 2, line 44, "upper case" should read --uppercase--.

In column 3, line 61, "track wheel" should read --trackwheel--.

In column 3, lines 62-63, "and a some" should read --and some--.

In column 4, lines 53-54, "a messages 52" should read --a message 52--.

In column 5, line 29, "upper case" should read --uppercase--.

In column 5, line 32, "upper case" should read --uppercase--.

In column 5, line 34, "upper case" should read --uppercase--.

In column 5, line 36, "upper case" should read --uppercase--.

In column 5, line 43, "upper case" should read --uppercase--.

Signed and Sealed this
Sixth Day of December, 2011

David J. Kappos
*Director of the United States Patent and Trademark Office*

In column 5, line 44, "lower case" should read --lowercase--.

In column 5, line 47, "upper case" should read --uppercase--.

In column 5, line 51, "upper case" should read --uppercase--.

In column 5, line 62, "upper case" should read --uppercase--.

In column 5, line 67, "upper case" should read --uppercase--.

In column 6, line 3, "that likely" should read --that are likely--.

In column 6, line 25, "upper case" should read --uppercase--.

In column 6, line 36, "upper case" should read --uppercase--.

In column 6, line 40, "upper case" should read --uppercase--.

In column 6, line 48, "upper case," should read --uppercase,--.

In column 6, lines 49-50, "upper case" should read --uppercase--.

In column 8, lines 15-16, claim 1, "upper case" should read --uppercase--.

In column 8, line 18, claim 1, "includes" should read --include--.

In column 8, line 21, claim 1, "non-upper case" should read --non-uppercase--.

In column 8, line 30, claim 1, "corresponds" should read --correspond--.

In column 9, lines 28-29, claim 11, "upper case" should read --uppercase--.

In column 9, line 31, claim 11, "includes" should read --include--.

In column 9, line 34, claim 11, "non-upper case" should read --non-uppercase--.

In column 9, line 43, claim 11, "corresponds" should read --correspond--.